(12) United States Patent
Matsushita

(10) Patent No.: US 12,139,233 B2
(45) Date of Patent: Nov. 12, 2024

(54) ELECTRIC SNOWMOBILE

(71) Applicant: Yamaha Hatsudoki Kabushiki Kaisha, Shizuoka (JP)

(72) Inventor: Yasushi Matsushita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 726 days.

(21) Appl. No.: 17/395,479

(22) Filed: Aug. 6, 2021

(65) Prior Publication Data

US 2022/0063764 A1    Mar. 3, 2022

(30) Foreign Application Priority Data

Aug. 26, 2020   (JP) ................. 2020-142378

(51) Int. Cl.
  *B62M 27/02*   (2006.01)
  *B60L 50/60*   (2019.01)
  *B60L 58/26*   (2019.01)
(52) U.S. Cl.
  CPC ............. *B62M 27/02* (2013.01); *B60L 50/66* (2019.02); *B60L 58/26* (2019.02); *B62M 2027/028* (2013.01)
(58) Field of Classification Search
  CPC ............................................... B62M 2027/028
  See application file for complete search history.

(56) References Cited

U.S. PATENT DOCUMENTS

| | | | |
|---|---|---|---|
| 10,493,833 B2 | 12/2019 | Hino | |
| 10,597,105 B2 | 3/2020 | Lefebvre et al. | |
| 11,597,473 B2 * | 3/2023 | Matsushita | B62J 43/16 |
| 2020/0088089 A1 | 3/2020 | Vezina et al. | |
| 2020/0140037 A1 * | 5/2020 | Haavikko | B62D 55/07 |
| 2022/0009589 A1 * | 1/2022 | Matsushita | B60L 50/60 |
| 2022/0017181 A1 * | 1/2022 | Suzuki | B62J 41/00 |
| 2022/0041250 A1 * | 2/2022 | Muron | B62B 13/16 |

FOREIGN PATENT DOCUMENTS

| | | |
|---|---|---|
| EP | 3536591 A1 | 9/2019 |
| JP | 2007182137 A * | 7/2007 |
| JP | 2018012347 A | 1/2018 |

OTHER PUBLICATIONS

Office Action of Nov. 23, 2022, for corresponding CA Patent Application No. 3,127,011, pp. 1-7.

* cited by examiner

*Primary Examiner* — Kevin Hurley
*Assistant Examiner* — Hosam Shabara
(74) *Attorney, Agent, or Firm* — HEA Law PLLC

(57) ABSTRACT

An electric snowmobile that prevents temperature rise of a control unit is provided. An electric snowmobile includes a body frame extending in a front-rear direction, a driver's seat supported by the body frame, an electric motor supported by the body frame, a ski supported by the body frame, a track mechanism including a track belt, supported by the body frame below the driver's seat, a battery that supplies electric power to the electric motor, and an inverter including an electronic component controlling a rotation of the electric motor and a housing for housing the electronic component. An opening is formed in the body frame so that a portion of the inverter is exposed from the opening to face the track belt.

13 Claims, 15 Drawing Sheets

ELECTRIC SNOWMOBILE

CROSS-REFERENCE TO RELATED APPLICATION

The present application claims priority from Japanese application JP2020-142378 filed on Aug. 26, 2020, the content of which is hereby incorporated by reference into this application.

FIELD OF THE INVENTION

The present invention relates to an electric snowmobile.

BACKGROUND OF THE INVENTION

Description of the Related Art

JP2018-12347A discloses a snowmobile (refer to FIG. 12 of JP2018-12347A) including the power generator having a supply current adjustment device (control unit) for adjusting the generated current.

The control unit as described in JP2018-12347A includes an electronic component that generates heat when being driven. As such, it is necessary to take measurements to prevent a temperature rise of the control unit.

One of the objects of the present disclosure is to provide an electric snowmobile that prevents a temperature rise of a control unit.

SUMMARY OF THE INVENTION (1) An electric snowmobile proposed in the present disclosure includes a body frame extending in a front-rear direction, a driver's seat supported by the body frame, an electric motor supported by the body frame, a ski supported by the body frame, a track mechanism, which includes a track belt, the track mechanism being supported by the body frame below the driver's seat, a battery that supplies electric power to the electric motor, and a control unit including an electronic component and a housing for housing the electronic component, the electronic component controlling a rotation of the electric motor or driving of the battery, wherein an opening is formed in the body frame so that a portion of the control unit is exposed from the opening to face the track belt. According to this snowmobile, it is possible to prevent a temperature rise of the control unit.

(2) In the electric snowmobile according to (1), a heat dissipating structure may be provided in the housing, and the opening may expose the heat dissipating structure so as to face the track belt. This serves to more efficiently prevent a temperature rise of the control unit.

(3) In the electric snowmobile according to (2), the heat dissipating structure may include a plurality of radiator fins protruding to an outside of the body frame. This serves to more efficiently prevent a temperature rise of the control unit.

(4) In the electric snowmobile according to (3), the heat dissipating structure may include a base portion and the plurality of radiator fins protruding from the base portion, and the electronic component may be provided on a surface of the base portion opposite to a surface on which the plurality of radiator fins are provided. This serves to more efficiently prevent a temperature rise of the control unit.

(5) In the electric snowmobile according to (4), the base portion may be fastened to a peripheral portion of the opening in the body frame using a fastener.

(6) In the electric snowmobile according to (4), a sealing member may be provided between the base portion and the peripheral portion of the opening in the body frame. This prevents snow and moisture from entering the interior of the electric snowmobile.

(7) In the electric snowmobile according to (4), the control unit may include a connection terminal, and the connection terminal may be provided on an opposite side of the plurality of radiator fins through the opening. This prevents snow and moisture from attaching to the connection terminal.

(8) In the electric snowmobile according to (1), the body frame may include an upper plate, on which the driver's seat is directly or indirectly disposed, and a front side plate extending downwardly from a front portion of the upper plate, and the opening may be formed in the front side plate, and the control unit is provided along the front side plate.

(9) In the electric snowmobile according to (8), the front side plate may include an inclined plate and a lower plate, the inclined plate extending and inclining forwardly and downwardly from the front portion of the upper plate, the lower plate extending downwardly from the inclined plate, the opening is formed in the inclined plate, and the control unit may be provided along the inclined plate.

(10) In the electric snowmobile according to (1), the body frame may include an upper plate on which the driver's seat is directly or indirectly disposed, the opening may be formed in the upper plate, and the control unit may be provided on the upper plate.

(11) In the electric snowmobile according to (1), the opening may be formed such that a portion of the track belt is disposed in an extension of the opening in a direction perpendicular to an opening surface of the opening. This serves to more efficiently prevent a temperature rise of the control unit.

(12) In the electric snowmobile according to (1), the control unit may be disposed between the electric motor and the track belt in a front-rear direction. This allows the center of gravity of the vehicle body to be located further rearward.

(13) In the electric snowmobile according to (1), the control unit may be disposed between the electric motor and the battery in a front-rear direction. This allows the center of gravity of the vehicle body to be located further rearward.

DETAILED DESCRIPTION OF THE INVENTION

Embodiments of the present invention will be described below in detail with reference to the accompanying drawings.

Figure 1:
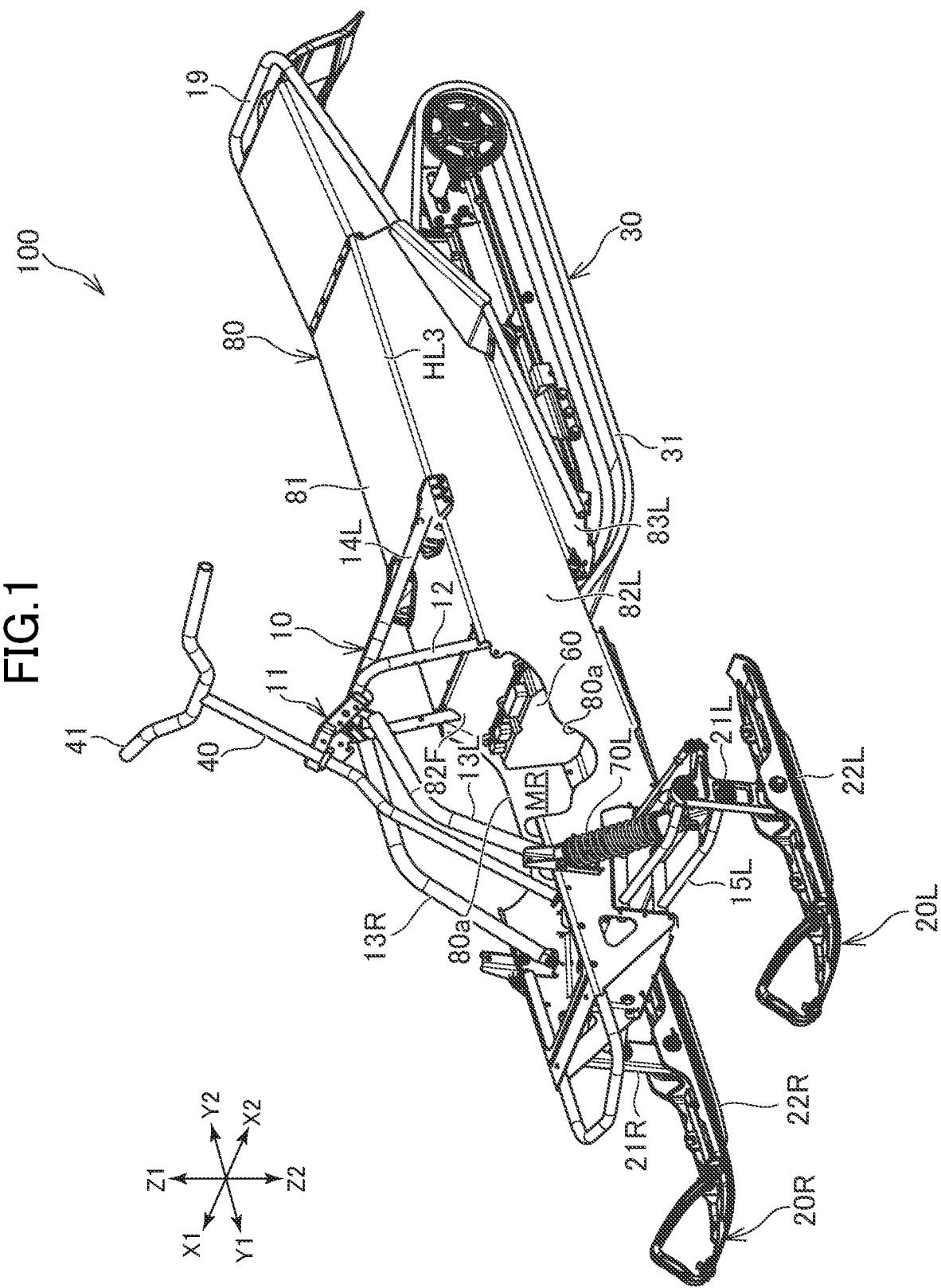
FIG. 1 is a perspective view of an electric snowmobile according to a first embodiment seen obliquely from above on a front side of the electric snowmobile.
Figure 2:
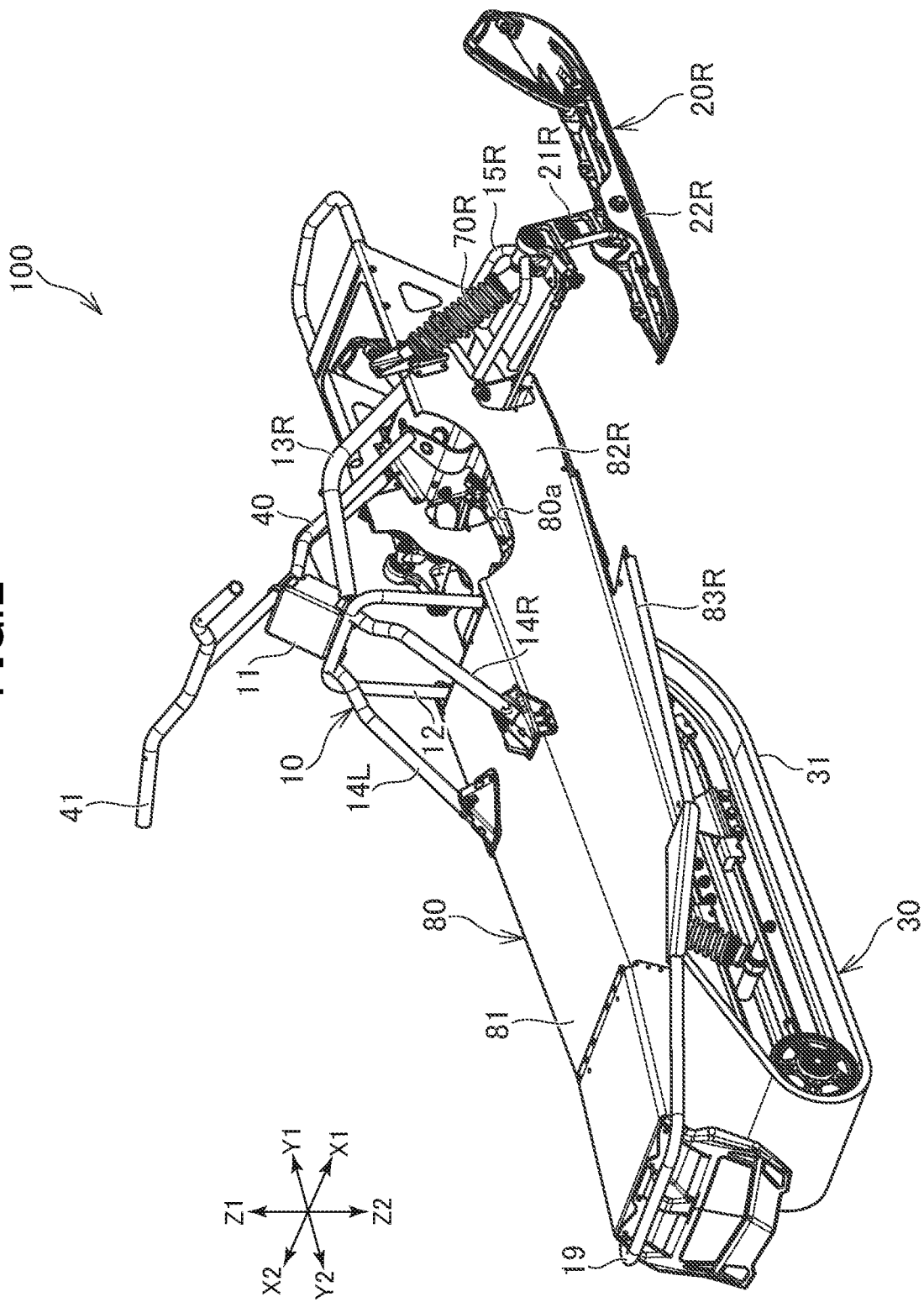
FIG. 2 is a perspective view of the electric snowmobile according to the first embodiment seen obliquely from above on a rear side of the electric snowmobile.
Figure 3:
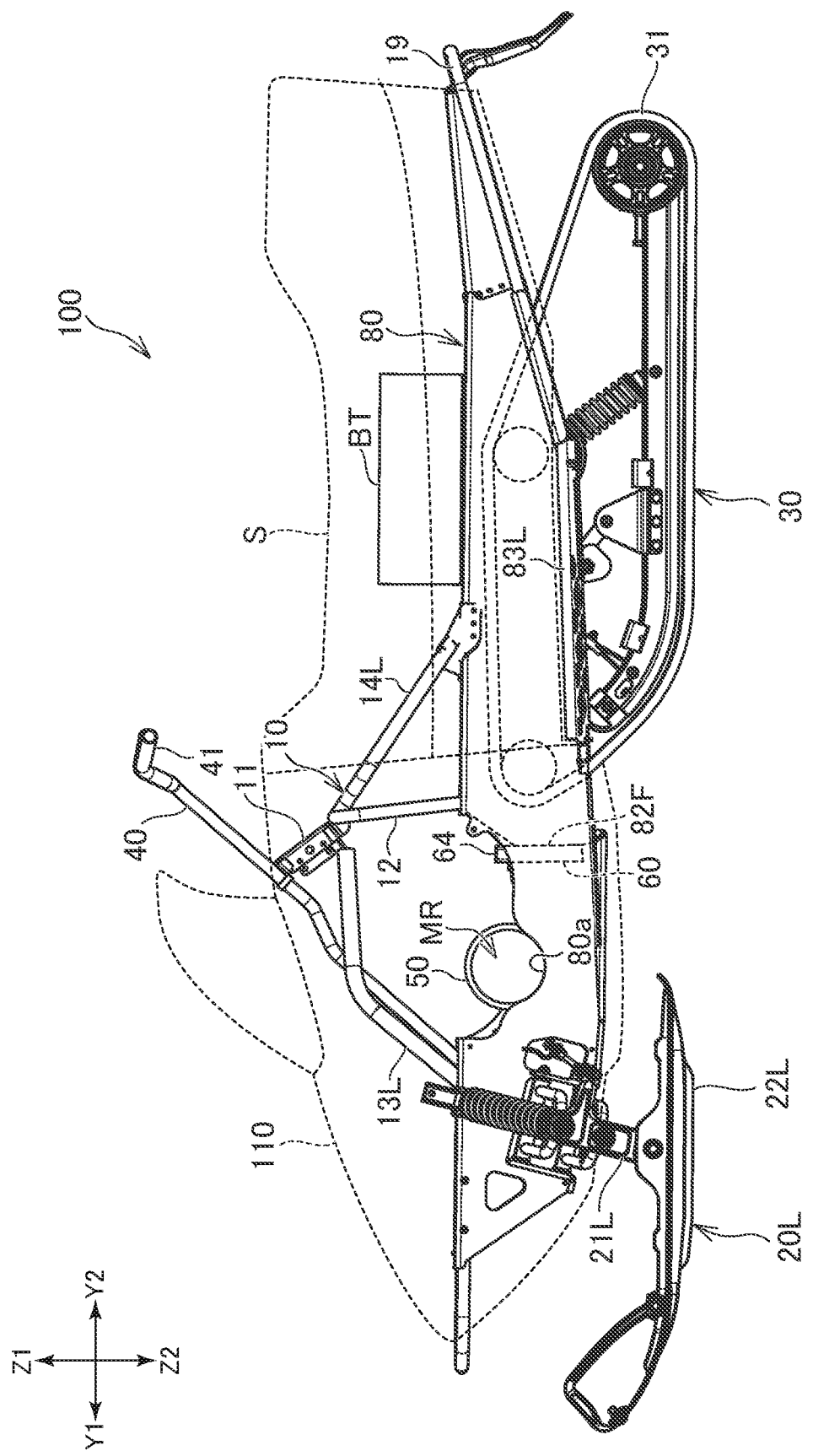
FIG. 3 is a side view of the electric snowmobile according to the first embodiment seen from the left.
Figure 4:
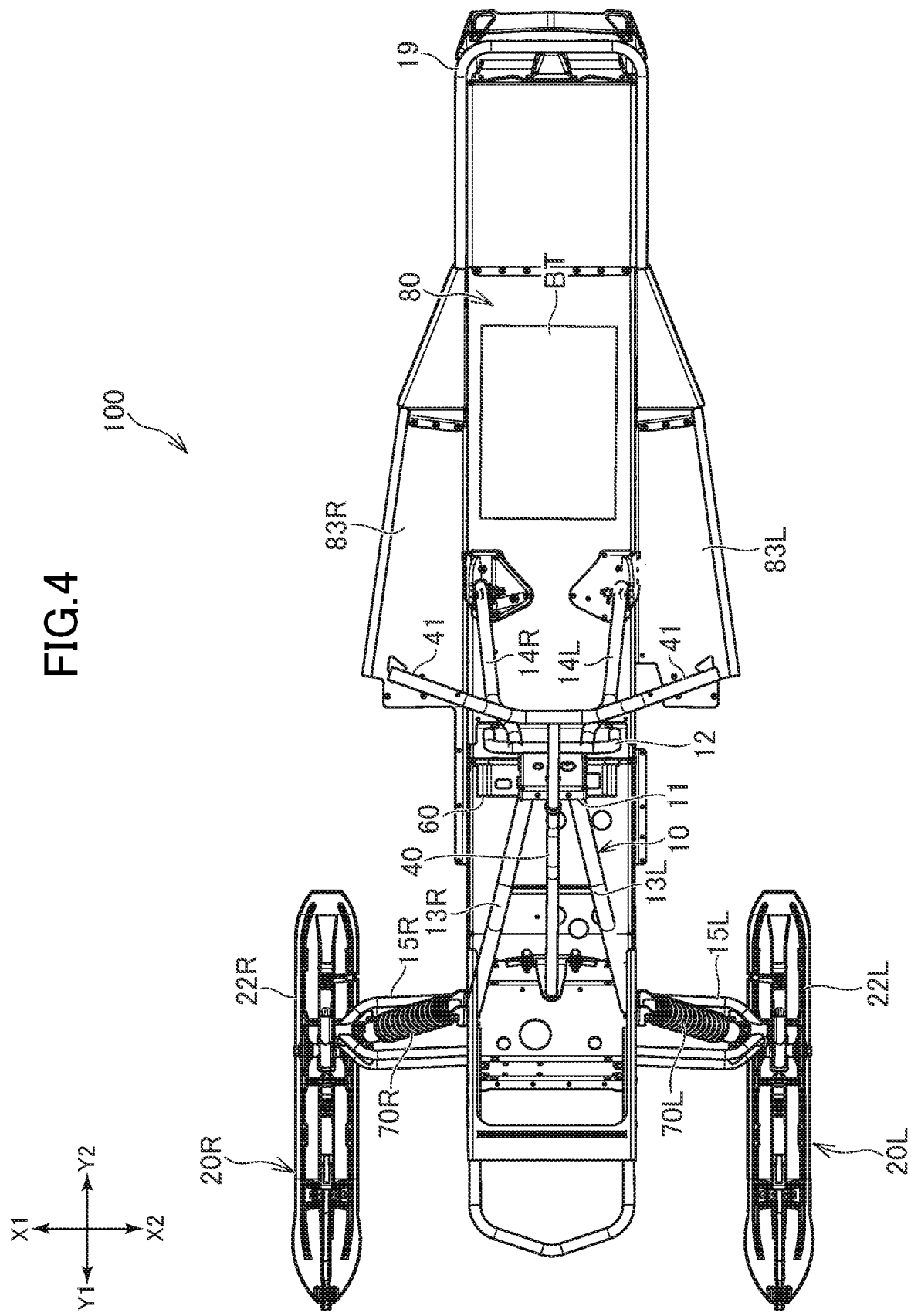
FIG. 4 is a top view of the electric snowmobile according to the first embodiment.
Figure 5:
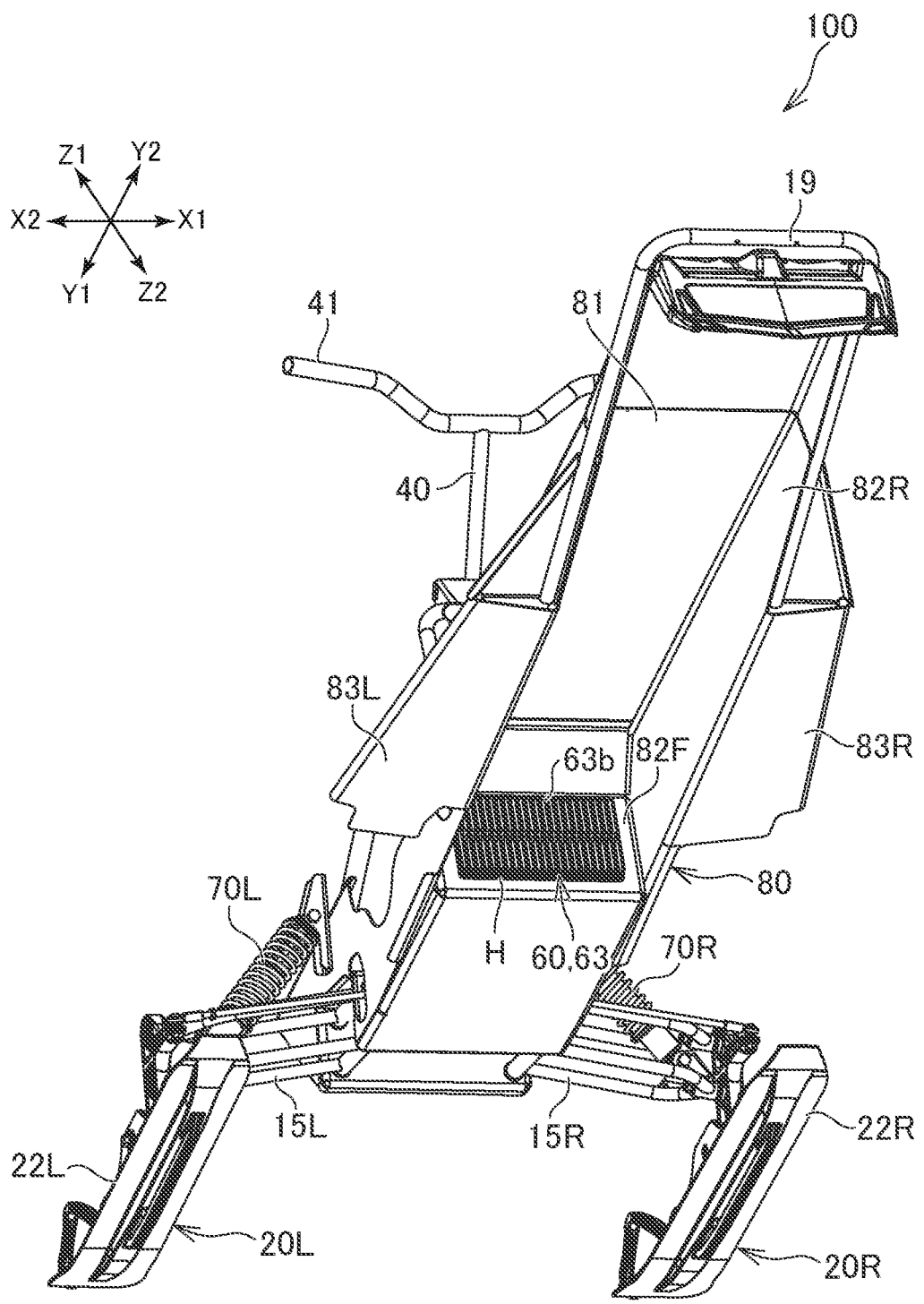
FIG. 5 is a perspective view of the electric snowmobile according to the first embodiment seen obliquely from below on a rear side of the electric snowmobile.
Figure 6:
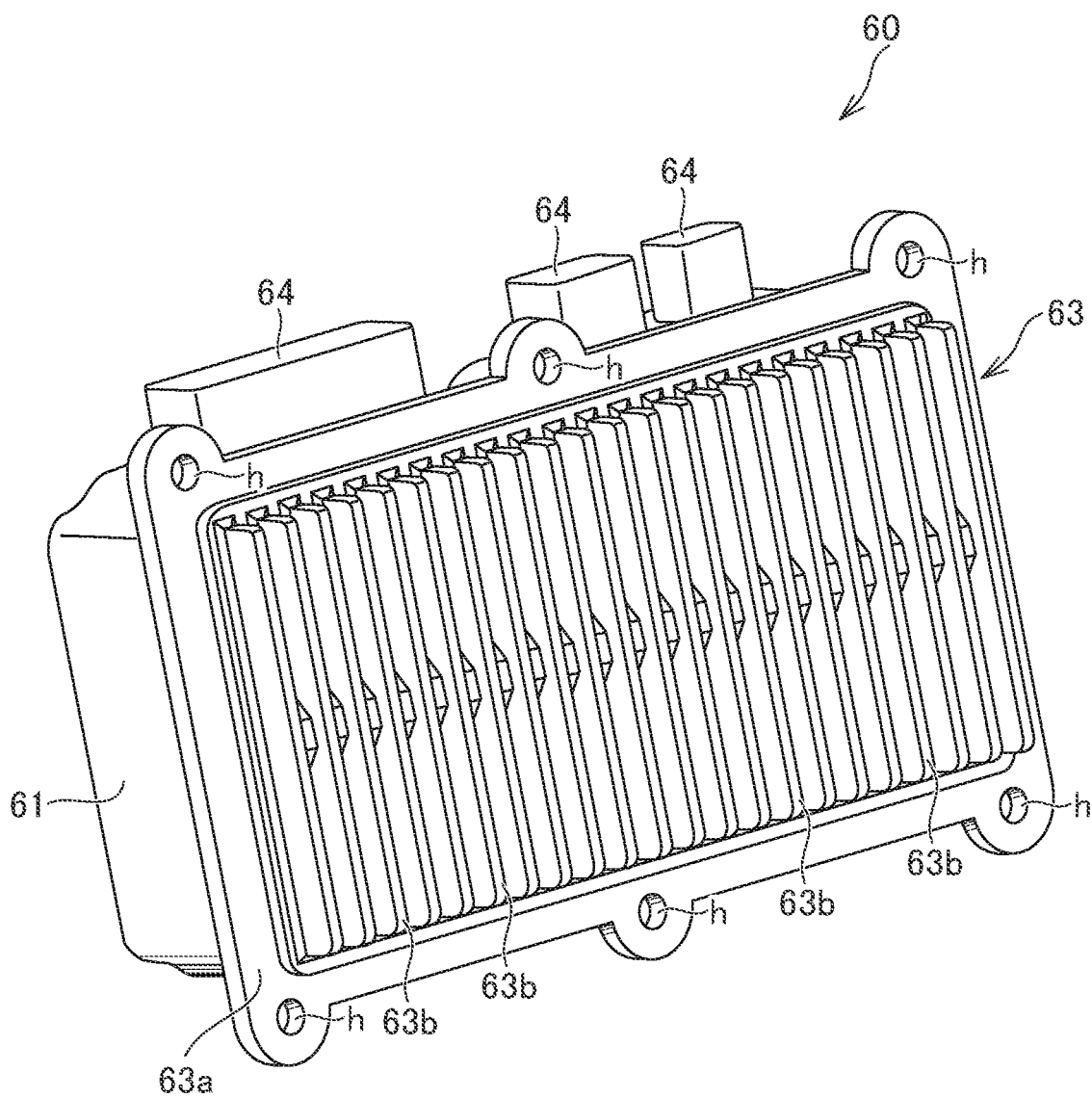
FIG. 6 is a perspective view of an inverter of the first embodiment.

FIG. 1 is a perspective view of an electric snowmobile according to a first embodiment seen obliquely from above on a front side of the electric snowmobile. FIG. 2 is a perspective view of the electric snowmobile according to the first embodiment seen obliquely from above on a rear side of the electric snowmobile. FIG. 3 is a side view of the electric snowmobile according to the first embodiment seen from the left. FIG. 4 is a top view of the electric snowmobile according to the first embodiment. FIG. 5 is a perspective view of the electric snowmobile according to the first embodiment seen obliquely from below on a rear side of the electric snowmobile. FIG. 6 is a perspective view of an inverter of the first embodiment. FIG. is a cross-sectional view of the inverter of the first embodiment and the periphery thereof.

In the following description, the directions indicated by Y1 and Y2 in the respective drawings are referred to as a front direction and a rear direction, respectively. The directions indicated by X1 and X2 are referred to as a right direction and a left direction, respectively. The direction indicated by Z1 and Z2 are referred to as an upward direction and a downward direction, respectively.

In the present specification, the term "supported" ("support") is used not only to indicate that a first member is directly attached to and supported by (supports) a second member, but also to indicate that the first member is attached to a third member and is supported by the second member via the third member.

[Outline of Electric Snowmobile 100]

The electric snowmobile 100 according to the first embodiment is a straddled vehicle that travels mainly on the snow. The electric snowmobile 100 travels by driving an electric motor 50 by electric power from a battery BT.

In the first embodiment, the electric motor 50 is shown in FIG. 3 but is omitted in other drawings. The battery BT is shown in FIGS. 3 and 4, but is omitted in other drawings. In FIG. 5, a track mechanism 30 is omitted.

An outer cover and a driver's seat are omitted in FIGS. 1, 2, and 4, and the outer cover 110 and the driver's seat S are shown in a broken line in FIG. 3 so that a shaft support frame 10 and the inverter 60 can be visually recognized.

The electric snowmobile 100 includes a shaft support frame 10, a right ski 20R and a left ski 20L, a track mechanism 30, a steering shaft 40, an electric motor 50, an inverter 60 as a control unit, a body frame 80, and a battery BT.

[Shaft Support Frame 10]

The shaft support frame 10 is a frame for supporting the steering shaft 40, and mainly formed of a pipe-like member. The member forming the shaft support frame 10 is not limited to a pipe-like member, and may include a plate-like member. The shaft support frame 10 may be made of metal or resin, for example. The shaft support frame 10 includes a shaft support portion 11, an auxiliary frame 12, a right front frame 13R, a left front frame 13L, a right rear frame 14R, and a left rear frame 14L.

As shown in FIG. 3, the shaft support portion 11 extends rearwardly and downwardly in a side view and its front end rotatably supports the steering shaft 40.

As shown in FIG. 2, the auxiliary frame 112 has an inverted U-shape composed of the upper portion attached to the shaft support portion 11 and the lower portion supported by the body frame 80.

The right front frame 13R and left front frame 13L have a shape extending forwardly and downwardly from the shaft support portion 11. The right front frame 13R and the left front frame 13L are provided to be spaced apart from each other in the vehicle width direction.

As shown in FIG. 4, the right front frame 13R is inclined in the right direction toward the front. The left front frame 13L is inclined in the left direction toward the front. That is, the right front frame 13R and the left front frame 13L are provided to be spaced apart from each other toward the front.

The right rear frame 14R and the left rear frame 14L extend rearwardly and downwardly from the shaft support portion 11. The right rear frame 14R and the left rear frame 14L are provided to be spaced apart from each other in the vehicle width direction.

As shown in FIG. 4, the right rear frame 14R is inclined in the right direction toward the rear. The left rear frame 14L is inclined in the left direction toward the rear. That is, the right rear frame 14R and the left rear frame 14L are provided to be spaced apart from each other toward the rear.

The steering shaft 40 extends upwardly and rearwardly. The lower end of the steering shaft 40 is rotatably supported by the body frame 80, and a steering handle 41 is provided at the upper end of the steering shaft 40. The steering shaft 40 is also rotatably supported by the shaft support frame 10 at the middle of its lower end and upper end.

The frames and the portions forming the shaft support frame 10 may be formed integrally, or may be separated and fixed to each other by coupling means such as bolts or welding or other known methods. Further, the frames and the portions forming the shaft support frame 10 may be made of resin and integrally formed with each other.

[Body Frame 80]

The body frame 80 forms the skeleton of the vehicle body and also supports each component of the electric snowmobile 100. Specifically, the body frame 80 supports the shaft support frame 10, the right ski 20R and the left ski 20L, the track mechanism 30, the steering shaft 40, the electric motor 50, the inverter 60, and the battery BT.

The body frame 80 extends in the front-rear direction and supports the lower ends of the portions of the shaft support frame 10 at its front portion, and includes the bumper 19 at its rear portion. In the body frame 80, the driver seat S shown in FIG. 3 is supported more rearward than the front portion for supporting the lower ends of the shaft support frame 10 and more forward than the bumper 19.

In the first embodiment, the body frame 80 has a motor housing region MR for housing the electric motor 50 (see e.g., FIG. 1). The motor housing region MR is a region that is recessed with respect to the upper surface (upper plate 81 to be described later) of the body frame 80, and notches 80a are formed at the left and right ends of the motor housing region MR. The left and right end portions of the electric motor 50 are fitted into the notches 18a and supported by the body frame 80. In this manner, the relatively heavy electric motor 50 is provided in the lower portion of the vehicle body, and thus the center of gravity of the vehicle body can be lowered. The lowered center of gravity of the vehicle body enables comfortable travel.

The body frame 80 includes an upper plate 81, a front side plate 82F extending downwardly from the front portion of the upper plate 81, a left side plate 82L extending downwardly from the left portion of the upper plate 81, and a right side plate 82R extending downwardly from the right portion of the upper plate 81. The upper plate 81, the front side plate 82F, the left side plate 82L, and the right side plate 82R form a space for accommodating the upper portion of the track belt 31. The front side plate 82F is provided for forming the motor housing region MR described above.

The upper plate 81 is a plate-like rectangular member in which its front-rear direction is the longitudinal direction in a top view, and supports the right rear frame 14R and the left rear frame 14L in its front portion. The driver's seat S is directly or indirectly disposed on the upper plate 81.

As shown in FIG. 3, the battery BT may be disposed on the upper plate 81. The number, size, and arrangement of the battery BT shown in FIG. 3 are merely examples, and not limited thereto.

The lower end of the left side plate 82L is provided with a left step 83L on which the left foot of the driver sitting on the driver's seat S is placed. The lower end of the right side plate 82R is provided with a right step 83R on which the right foot of the driver sitting on the driver's seat S is placed. The left step 83L and the right step 83R are plate-like members having a predetermined width in the vehicle width direction.

In the first embodiment, an opening H is formed in the front side plate 82F of the body frame 80. The opening H is formed so as to expose a heat sink 63, which is provided in a housing 61 of the inverter 60, to be opposed to the track belt 31. The details of the configuration and arrangement of the inverter 60 will be described later.

[Right Ski 20R, Left Ski 20L]

The electric snowmobile 100 further includes a right ski support frame 15R and a left ski support frame 15L. The right ski support frame 15R extends rightward at the front portion of the body frame 80 and supports the right ski 20R at its right end. The left ski support frame 15L extends leftward at the front portion of the body frame 80 and supports the left ski 20L at its left end.

The right ski 20R is composed of a supported portion 21R supported by the right ski support frame 15R and extending downward, and a plate portion 22R attached to the lower end of the supported portion 21R. Similarly, the left ski 20L is composed of a supported portion 21L supported by the left ski support frame 15L and extending downward, and a plate portion 22L attached to the lower end of the supported portion 21R.

In the present embodiment, suspensions 70R and 70L each having a spring structure and a damper are provided so as to cross the right ski 20R, the left ski 20L, and the body frame 80.

[Track Mechanism 30]

Track mechanism 30 is supported by the body frame 80 more rearward than the right ski 20R and left ski 20L. The track mechanism 30 includes a track belt 31 that is rotated by the driving force of the electric motor 50. The rotation of the track belt 31 moves the vehicle body.

[Electric Motor 50]

As shown in FIG. 3, the electric motor 50 is supported by the body frame 80. In the first embodiment, the electric motor 50 is positioned more rearward than the mounting positions of the right ski support frame 15R and the right ski 20R to the left ski support frame 15L and the left ski 20L. In this manner, the relatively heavy electric motor 50 is disposed rearward, and thus the center of gravity of the vehicle body can be positioned rearward. This eases the handling of the steering handle 41 and enables comfortable travel.

[Battery BT]

The battery BT supplies power to the electric motor 50. The operation of the battery BT may be controlled by a battery controller, such as a BMS (Battery Management System) (not shown).

As described above, the battery BT may be disposed on the upper plate 81 of the body frame 80. However, the present invention is not limited thereto, and the battery BT may be, for example, suspended by the right front frame 13R, the left front frame 13L, the right rear frame 14R, and the left rear frame 14L above the electric motor 50 and the inverter 60. The battery BT may include a plurality of battery cells.

[Inverter 60]

The inverter 60 is a device driven by the power supplied from the battery BT and controls the rotation of the electric motor 50. In the first embodiment, the inverter 60 includes electronic components 62, such as an FET (Field Effect Transistor) for controlling the rotation of the electric motor 50, and a housing 61 for housing the electronic components 62.

The inverter 60 is electrically connected to the electric motor 50 and the battery BT via wiring, for example, and thus may be preferably disposed in the vicinity of the electric motor 50 and the battery BT. As such, in the first embodiment, the inverter 60 is disposed between the electric motor 50 and the battery BT in the front-rear direction.

Further, the inverter 60 is disposed between the electric motor 50 and the track belt 31 in the front-rear direction. That is, the inverter 60 is disposed more rearward than the electric motor 50. In this manner, the relatively heavy inverter 60 is disposed more rearward than the electric motor 50, and thus the center of gravity of the vehicle body can be positioned rearward. This eases the handling of the steering handle 41 and enables comfortable travel.

The inverter 60 is disposed below the upper plate 81 of the body frame 80. In this manner, the relatively heavy inverter 60 is disposed in a lower position, and thus the center of gravity of the vehicle body can be positioned rearward. This eases the handling of the steering handle 41 and enables comfortable travel.

The electronic components 62 housed in the housing 61 generate heat when the inverter 60 is driven. In the first embodiment, the housing 61 of the inverter 60 includes a heat sink 63, which is a heat dissipating structure. The heat sink 63 may be integral with or separate from the housing 61. That is, the heat sink 63 may form a portion of the housing 61.

[Control of Temperature Rise of Inverter 60]

Although a rise in the temperature of the inverter 60 can be controlled by the heat sink 63 provided in the inverter 60, the first embodiment employs a configuration capable of more effectively controlling the temperature rise in the inverter 60. Hereinafter, the details will be described.

Figure 7:
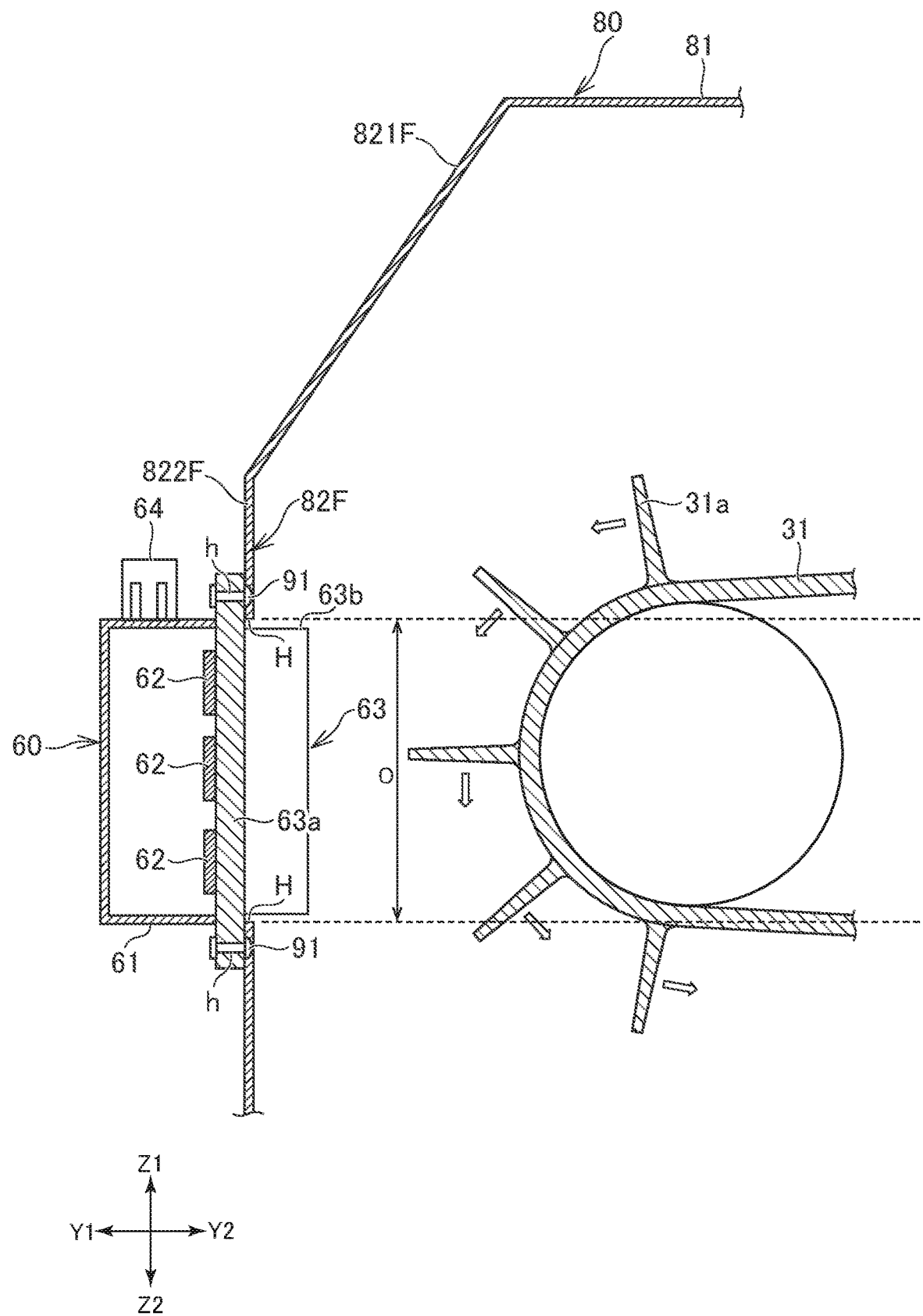
FIG. 7 is a cross-sectional view of the inverter of the first embodiment and the periphery thereof.

As shown in FIGS. 6 and 7, the heat sink 63 includes a base portion 63a and a plurality of radiator fins 63b protruding from the base portion 63a. In FIG. 6, only some of the radiator fins 63b are denoted by reference numerals.

The heat sink 63 has the plurality of radiator fins 63b, which increase its surface area and thus improve its heat dissipation function. That is, the heat generated from the electronic components 62 in the housing 61 can be easily released to the outside air through the heat sink 63.

As shown in FIG. 7, in the first embodiment, the electronic components 62 as heating elements are disposed on the base portion 63a of the heat sink 63 opposite to the surface on which the radiator fins 63b are disposed. That is, the electronic components 62 are disposed in direct contact with the base portion 63a of the heat sink 63. As such, the heat generated from the electronic components 62 is transferred to the radiator fins 63b only through the base portion 63a. In this manner, the electronic components 62 are disposed directly on the heat sink 63, and this configuration allows the radiator fins 63b to more efficiently release the heat generated from the electronic components 62.

In the first embodiment, the opening H is formed in the front side plate 82F of the body frame 80. The housing 61 of the inverter 60 is provided along the front side plate 82F such that the radiator fins 63b of the heat sink 63 are exposed from the opening H. This allows the radiator fins 63b of the heat sink 63 to be exposed in an area that is not covered by the outer cover 110 forming the exterior of the vehicle body. The radiated heat is hardly accumulated in the area that is not covered by the outer cover 110 forming the exterior of the vehicle body. As such, the heat generated from the electronic components 62 can be more efficiently released from the radiator fins 63b.

In the first embodiment, as shown in FIG. 7, the opening H is formed such that its opening surface is opposed to the track belt 31. Specifically, the opening H is formed such that a portion of the track belt 31 is disposed in the extension of the opening H in the direction perpendicular to the opening surface of the opening H. O, shown in FIG. 7, indicates a range of the extension of the opening H in the direction perpendicular to the opening surface of the opening H. In the first embodiment, the direction perpendicular to the opening surface of the opening H is a horizontal direction (front-rear direction). The radiator fins 63b protrude to the outside of the body frame 80 in the direction perpendicular to the opening surface of the opening H. The outside of the body frame 80 is a side that is not covered by the outer cover 110. Further, no other member is provided between the radiator fins 63b and the track belt 31.

With such a configuration, snow and moisture, splashed by the rotation of the track belt 31, are in contact with the radiator fins 63b of the heat sink 63 exposed from the opening H. In this manner, the snow and moisture that was attached to the track belt 31 can cool the radiator fins 63b.

As such, the heat generated from the electronic components 62 can be more efficiently released from the radiator fins 63b. The arrows in FIG. 7 indicate the direction of rotation of the track belt 31 when the electric snowmobile 100 travels forward.

As shown in FIG. 7, the track belt 31 may preferably have convex portions 31a arranged side by side at predetermined intervals in the rotation direction. Such a structure can more efficiently apply the snow and moisture attached to the track belt 31 to the radiator fins 63b.

The outer shape of the base portion 63a of the heat sink 63 may preferably be larger than the outer shape of the opening H of the front side plate 82F. As shown in FIG. 7, the base portion 63a of the heat sink 63 may be fastened to the peripheral portion of the opening H of the front side plate 82F using fasteners 91. Such fasteners can be bolts, for example. Further, the base portion 63a of the heat sink 63 may have holes h to which the fasteners 91 are inserted around its edge. FIG. 6 shows the base portion 63a having six holes h formed therein.

The inverter 60 also includes a connection terminal 64 to which the power supply lines and signal lines are connected. The connection terminal 64 may be provided on the opposite side of the radiator fins 63b through the opening H. In other words, the connection terminal 64 may be provided so as to be covered with the outer cover 110 (see FIG. 3). This can prevent snow and moisture from attaching to the connection terminal 64.

Modification of First Embodiment

Figure 8:
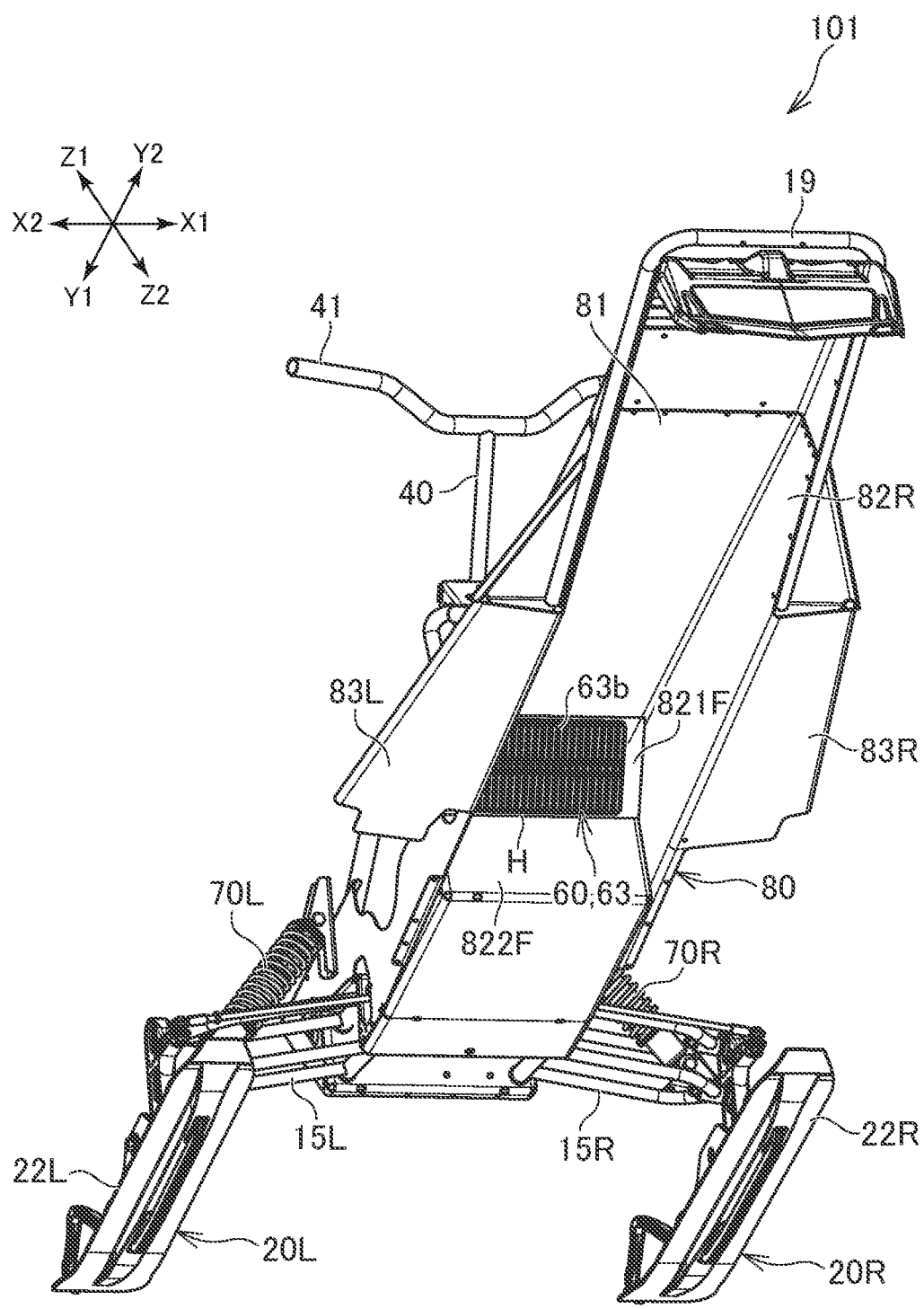
FIG. 8 is a perspective view showing the electric snowmobile according to a modification of the first embodiment seen obliquely from below on the rear side of the electric snowmobile.
Figure 9:
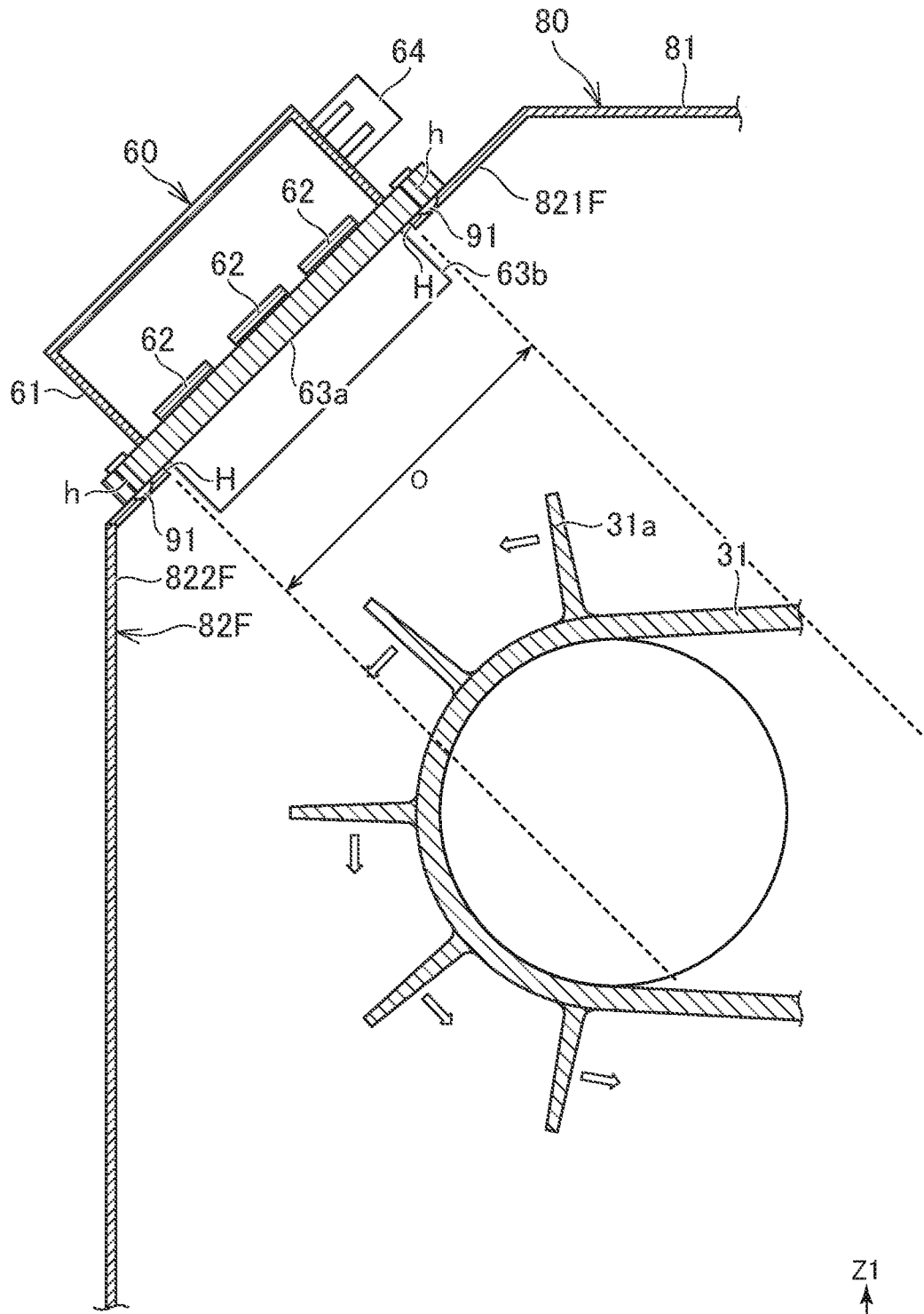
FIG. 9 is a cross-sectional view of an inverter and its periphery of the modification of the first embodiment.

Next, referring to FIGS. 8 and 9, an electric snow mobile 101 according to a modification of the first embodiment will be described. FIG. 8 is a perspective view showing the electric snowmobile according to the modification of the first embodiment seen obliquely from below on the rear side of the electric snowmobile. FIG. 9 is a cross-sectional view of an inverter and its periphery of the modification of the first embodiment. The same reference numerals are used to denote the same functional components as those described with reference to FIGS. 1 to 7, and description thereof is omitted.

The front side plate 82F includes an inclined plate 821F extending and inclining forwardly and downwardly from the front portion of the upper plate 81, and a lower plate 822F extending downwardly from the lower end of the inclined plate 821F. In the modification, an opening H is formed in the inclined plate 821F of the front side plate 82F. The inverter 60 is fixed to the inclined plate 821F so that the radiator fins 63b of the heat sink 63 are exposed from the opening H.

In the modification as well, as shown in FIG. 9, the opening H is formed such that its opening surface is opposed to the track belt 31. Specifically, the opening H is formed such that a portion of the track belt 31 is disposed on the extension of the opening H in the direction perpendicular to the opening surface of the opening H. O, shown in FIG. 9, is a range showing the extension of the opening H in a direction perpendicular to the opening surface of the opening H. In the modification, the direction perpendicular to the opening surface of the opening H is a direction inclined rearwardly and downwardly. The radiator fins 63b protrude to the outside of the body frame 80 in the direction perpendicular to the opening surface of the opening H. Further, no other member is provided between the radiator fins 63b and the track belt 31.

A part of the snow and moisture attached to the track belt 31 is moved upward. The snow and moisture move forward along the back surface of the upper plate 81. As such, in the modification, a greater amount of snow and moisture reach the radiator fins 63b than the configuration shown in FIG. 7, for example. As such, the heat generated from the electronic components 62 can be more efficiently released from the radiator fins 63b.

Second Embodiment

Figure 10:
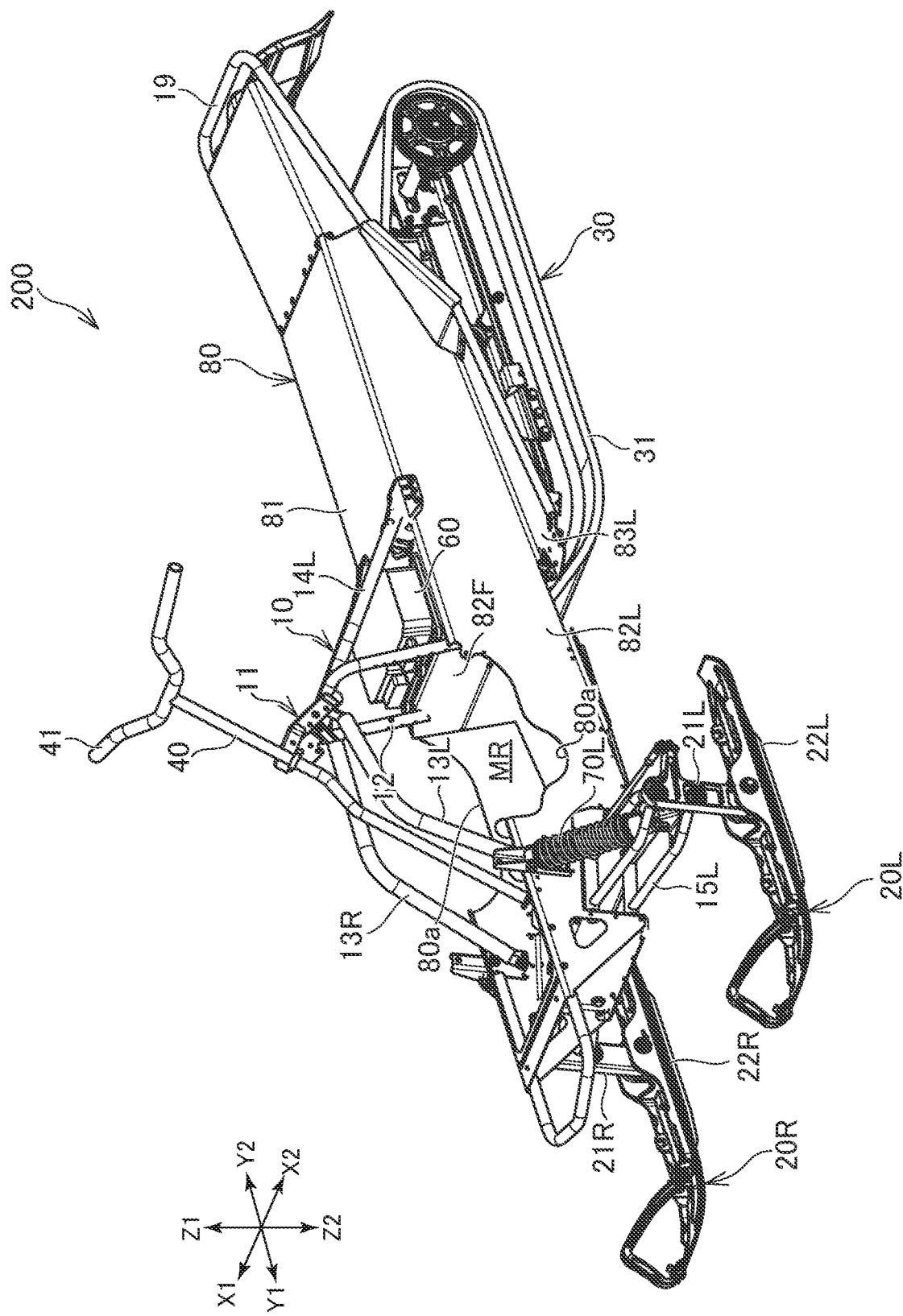
FIG. 10 is a perspective view of an electric snowmobile according to a second embodiment seen obliquely from above on a front side of the electric snowmobile.
Figure 11:
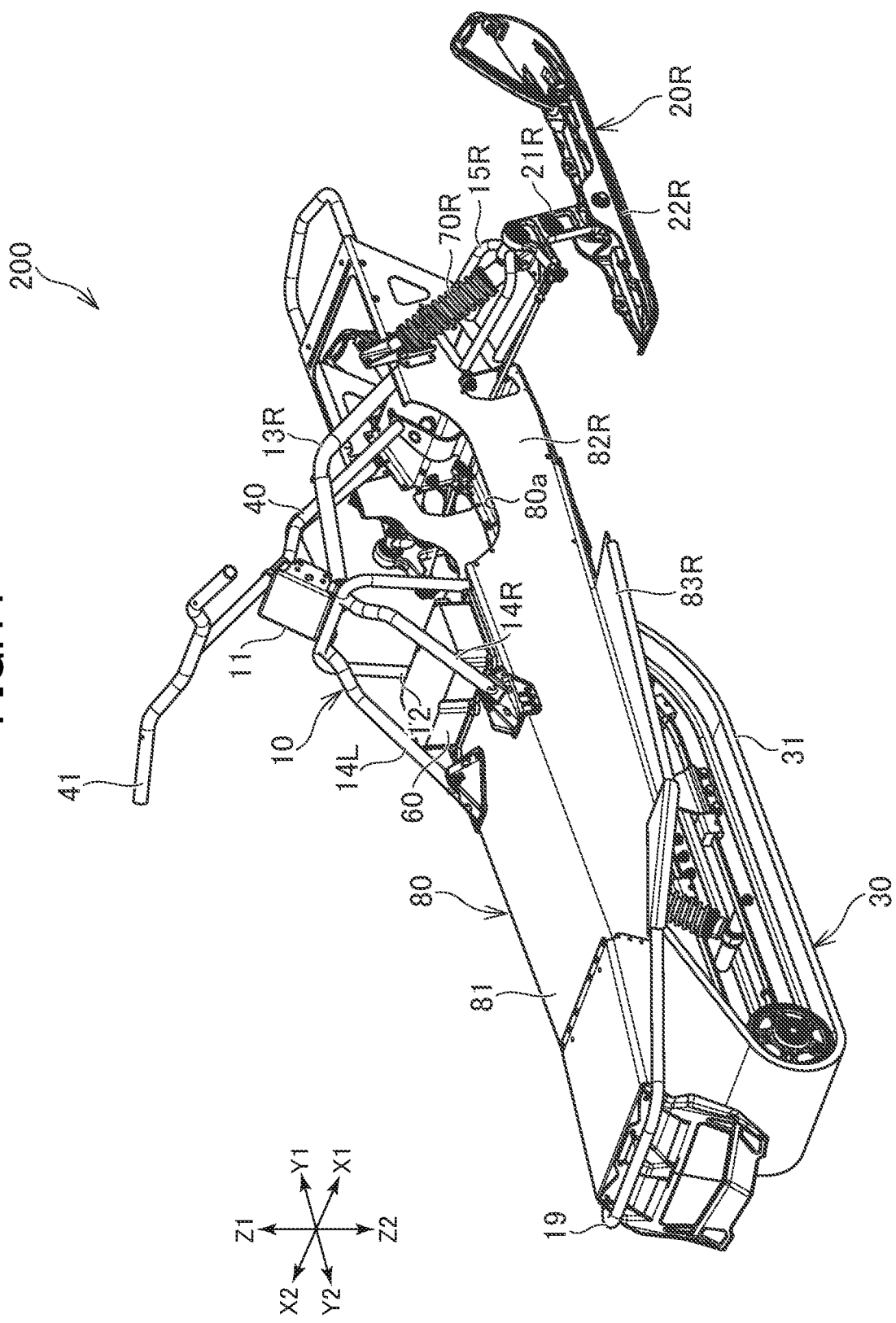
FIG. 11 is a perspective view of the electric snowmobile according to the second embodiment seen obliquely from above on a rear side of the electric snowmobile.
Figure 12:
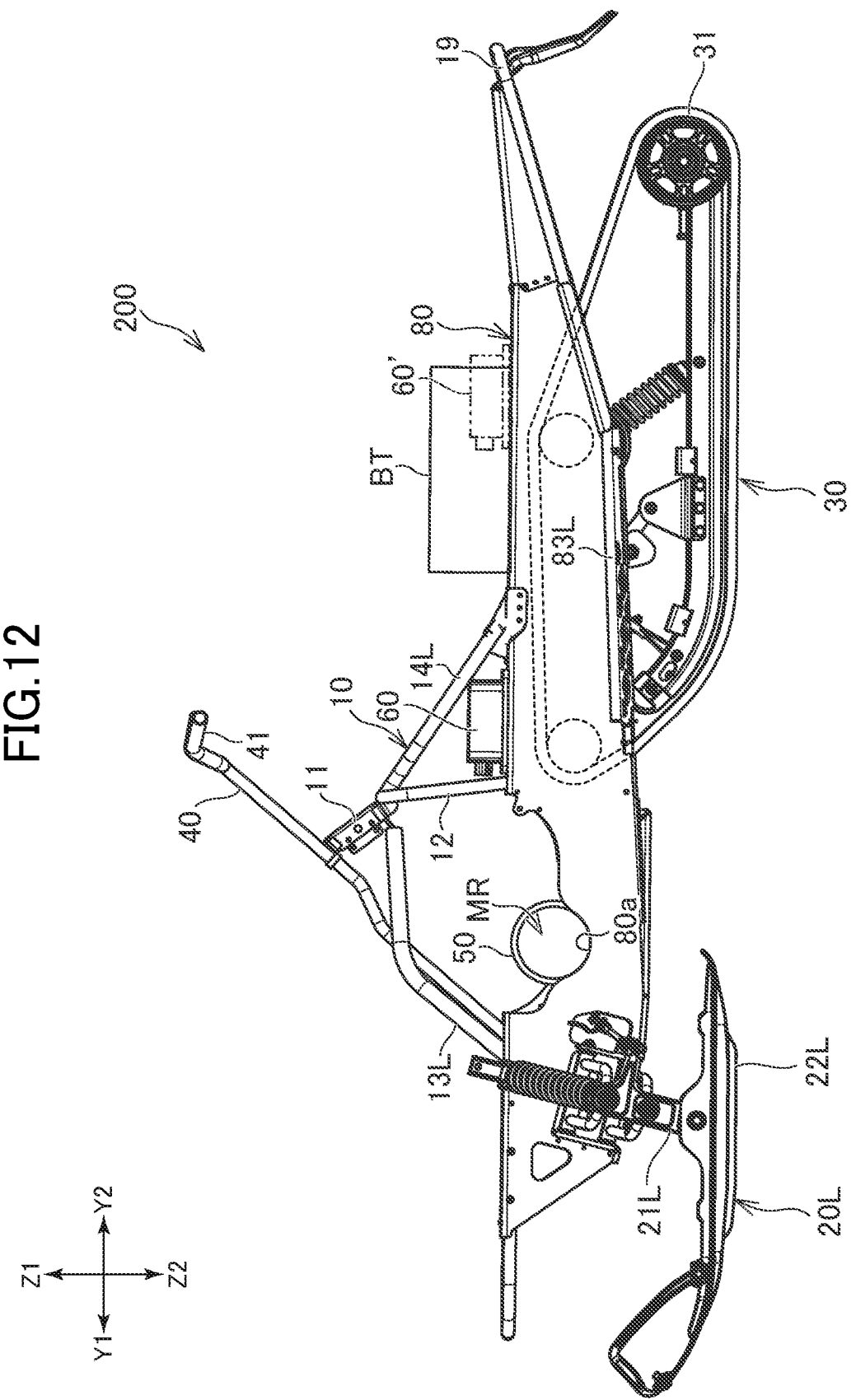
FIG. 12 is a side view of an electric snowmobile according to the second embodiment as viewed from the left.
Figure 13:
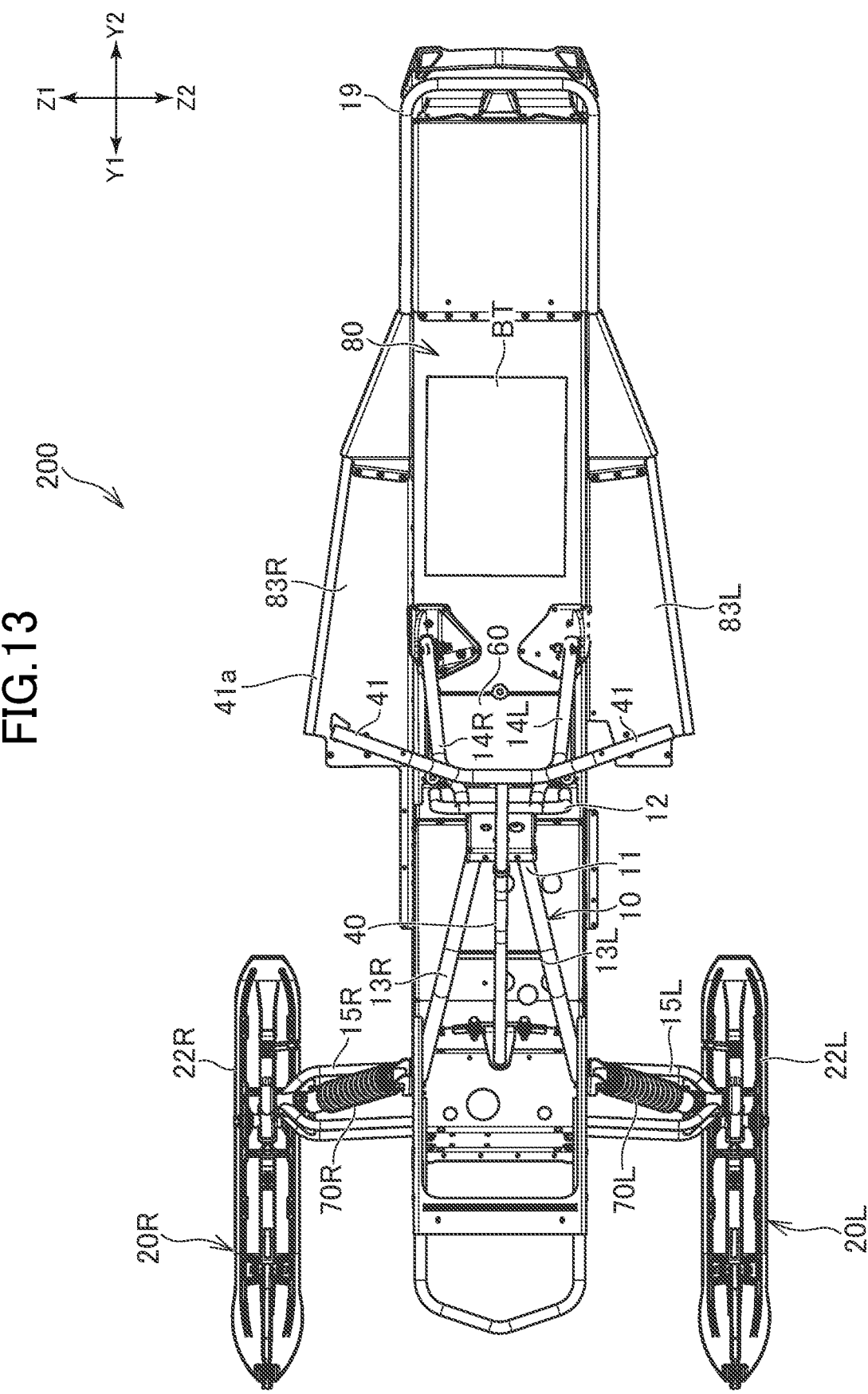
FIG. 13 is a top view of the electric snowmobile according to the second embodiment.
Figure 14:
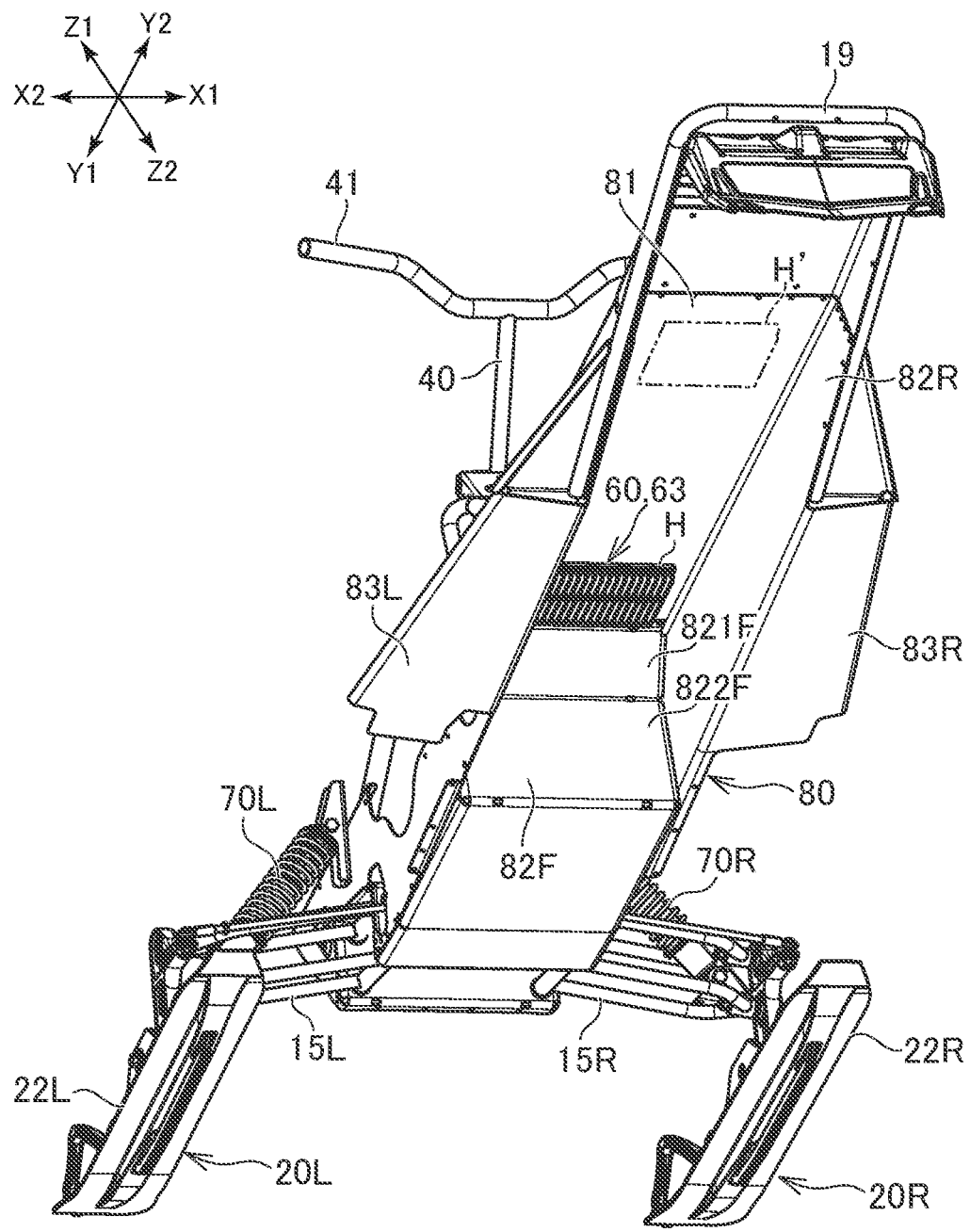
FIG. 14 is a perspective view of the electric snowmobile according to the second embodiment seen obliquely from above on a rear side of the electric snowmobile.
Figure 15:
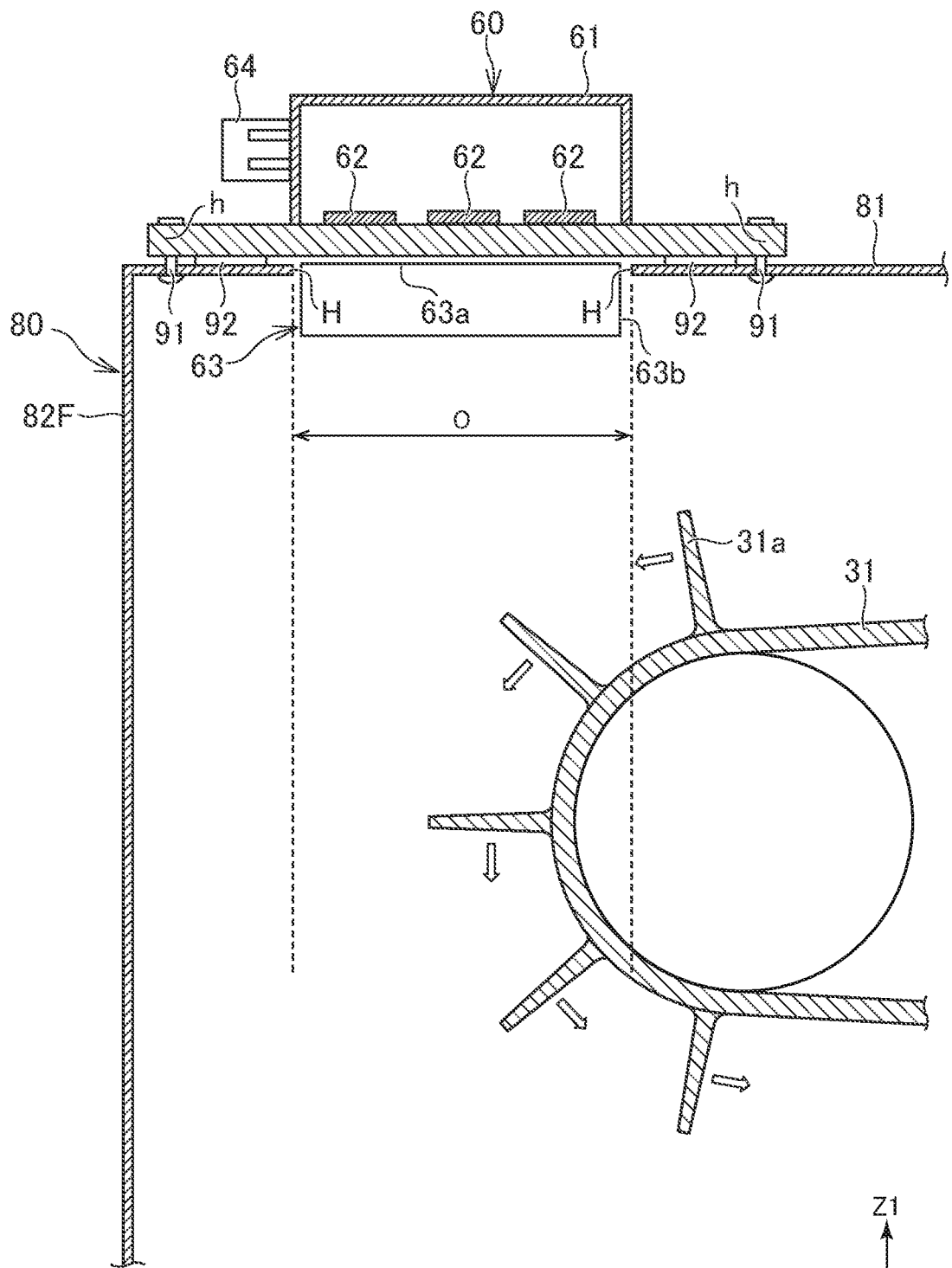
FIG. 15 is a cross-sectional view of an inverter and its periphery of the modification of the first embodiment.

Next, referring to FIGS. 10 to 15, an electric snowmobile 200 according to the second embodiment will be described. FIG. 10 is a perspective view of the electric snowmobile according to the second embodiment seen obliquely from above on a front side of the electric snowmobile. FIG. 11 is a perspective view of the electric snowmobile according to the second embodiment seen obliquely from above on a rear side of the electric snowmobile. FIG. 12 is a side view of the electric snowmobile according to the second embodiment seen from the left. FIG. 13 is a top view of the electric snowmobile according to the second embodiment. FIG. 14 is a perspective view of the electric snowmobile according to the second embodiment seen obliquely from below on a rear side of the electric snowmobile. FIG. 15 is a cross-sectional view illustrating an inverter of the second embodiment and its periphery thereof. The same reference numerals are used to denote the same functional components as those described with reference to FIGS. 1 to 7, and description thereof is omitted.

In the second embodiment, the opening H is formed in the upper plate 81. The inverter 60 is fixed to the upper plate 81 so that the radiator fins 63b of the heat sink 63 are exposed from the opening H.

In the second embodiment as well, as shown in FIG. 15, the opening H is formed such that its opening surface is opposed to the track belt 31. Specifically, the opening H is formed such that a portion of the track belt 31 is disposed on the extension of the opening H in the direction perpendicular to the opening surface of the opening H. O, shown in FIG. 15, indicates a range of the extension of the opening H in the direction perpendicular to the opening surface of the opening H. In the second embodiment, the direction perpendicular to the opening surface of the opening H is a vertical direction. The radiator fins 63b protrude to the outside of the body frame 80 in the direction perpendicular to the opening surface of the opening H. Further, no other member is provided between the radiator fins 63b and the track belt 31.

A part of the snow and moisture attached to the track belt 31 is moved upward. The wound-up snow and moisture move forward along the back surface of the upper plate 81. As such, a greater amount of snow and moisture reach the radiator fins 63b than the configuration shown in FIG. 7, for example. As such, the heat generated from the electronic components 62 can be more efficiently released from the radiator fins 63b.

In the second embodiment, the inverter 60 is disposed more rearward than the front side plate 82F in the longitudinal direction. In this manner, the relatively heavy inverter 60 is disposed rearward, and thus the center of gravity of the vehicle body can be positioned rearward. This eases the handling of the steering handle 41 and enables comfortable travel.

In the second embodiment, the inverter 60 is disposed below the shaft support frame 10. More specifically, as shown in FIG. 12, the inverter 60 is disposed in a region surrounded by a line connecting the left front frame 13L, the left rear frame 14L, and the lower ends of the left front frame 13L and the left rear frame 14L in a side view. This allows the region formed by the shaft support frame 10 to be effectively utilized.

As shown in FIG. 15, a sealing member 92 may be provided between the base portion 63a of the heat sink 63 and the peripheral portion of the opening H of the upper plate 81. The sealing member 92 may have an annular shape surrounding the opening H. This prevents the snow and moisture moved up by the track belt 31 from entering in the interior of the electric snowmobile 100 through the gap between the base portion 63a and the upper plate 81. The sealing member 92 may also be employed in the examples shown in FIGS. 7 and 9. In that case, the sealing member 92 may be provided between the base portion 63a of the heat sink 63 and the peripheral portion of the opening H in the front side plate 82F.

In the second embodiment, the opening H is formed in the front portion of the upper plate 81, but the position of the opening H is not limited to this example. The opening H may be formed in the rear portion of the upper plate 81. For example, the opening H may be formed in the upper plate 81 at a position below the seat surface of the driver's seat S or at a position rearward of and below the seat surface of the driver's seat S. As described, the position at which the opening is formed is not particularly limited, but the opening is preferably formed at a position where snow and moisture splashed along with the rotation of the track belt 31 are likely to come into contact with the heat sink 63 exposed from the opening. FIG. 14 shows an opening H' formed in the rear portion of the upper plate 81 by a virtual line (two-dot chain line). FIG. 12 shows an inverter 60' disposed such that the heat sink 63 is exposed from the opening H' formed at the position shown in FIG. 14 by a virtual line (two-dot chain line). The inverter 60' shown in FIG. 12 is disposed above the portion of the track belt 31 inclined upward toward the front. With such a configuration, the snow and moisture splashed along with the rotation of the track belt 31 are likely come into contact with the heat sink 63.

In the embodiments and the modifications described above, the inverter 60 is taken as an example of a control unit, but the present invention is not limited thereto. That is, the heat dissipating structure and arrangement of the inverter 60 may be employed in other control units, such as BMS for controlling the driving of the battery BT and MCU (Motor Control Unit) for controlling the rotation of the electric motor 50. Specifically, for example, the BMS as a control unit may include a housing in which the heat sink is housed, and be provided on the body frame 80 such that the heat sink is exposed from the opening H.

In the above embodiments and modifications, the heat sink 63 provided in the inverter 60 is exposed from the opening H, but the exposed portion is not limited thereto. That is, the portion other than the heat sink 63 of the inverter 60 may be exposed from the opening H. Further, the radiator fin 63b is not an essential element of the heat sink 63, and the heat sink 63 may at least have a heat releasing structure.

Outline of Embodiment (1) An electric snowmobile 100 includes a body frame 80 extending in a front-rear direction, a driver's seat S supported by the body frame 80, an electric motor 50 supported by the body frame 80, skis 20R and 20L supported by the body frame 80, a track mechanism 30 including a track belt 31, supported by the body frame 80 below the driver's seat S, a battery BT that supplies electric power to the electric motor 50, and an inverter 60 including an electronic component 62 controlling a rotation of the electric motor 50 and a housing 61 for housing the electronic component 62. An opening H is formed in the body frame 80 so that a portion of the inverter 60 is exposed from the opening H to face the track belt 31.

(2) A heat sink 63 is provided in the housing 61, and the opening H exposes the heat sink 63 so as to face the track belt 31.

(3) The heat sink 63 includes a plurality of radiator fins 63b protruding to an outside of the body frame 80.

(4) The heat sink 63 includes a base portion 63a and the plurality of radiator fins 63b protruding from the base portion 63a, and the electronic component 62 is provided on a surface of the base portion 63a opposite to a surface on which the plurality of radiator fins 63b are provided.

(5) The base portion 63a is fastened to a peripheral portion of the opening H in the body frame 80 using a fastener 91.

(6) A sealing member 92 is provided between the base portion 63a and the peripheral portion of the opening H in the body frame 80.

(7) The inverter 60 includes a connection terminal 64, and the connection terminal 64 is provided on an opposite side of the plurality of radiator fins 63b through the opening H.

(8) The body frame 80 includes an upper plate 81, on which the driver's seat S is directly or indirectly disposed, and a front side plate 82F extending downwardly from a front portion of the upper plate 81. The opening H is formed in the front side plate 82F, and the inverter 60 is provided along the front side plate 82F.

(9) The front side plate 82F includes an inclined plate 821F extending and inclining forwardly and downwardly from the front portion of the upper plate 81 and a lower plate 822F extending downwardly from the inclined plate 821F. The opening H is formed in the inclined plate 821F, and the inverter 60 is provided along the inclined plate 821F.

(10) The body frame 80 includes an upper plate 81 on which the driver's seat S is directly or indirectly disposed. The opening H is formed in the upper plate 81, and the inverter 60 is provided on the upper plate 81.

(11) The opening H is formed such that a portion of the track belt 31 is disposed on an extension of the opening H in a direction perpendicular to an opening surface of the opening H.

(12) The inverter 60 is disposed between the electric motor 50 and the track belt 31 in a front-rear direction.

(13) The inverter 60 is disposed between the electric motor 50 and the battery BT in a front-rear direction.

The present invention is not limited to embodiment described above, and various modifications can be made. For example, the configurations described in embodiment can be replaced by a configuration that is substantially the same, a configuration that provides the same action and effect, or a configuration that is capable of achieving the same object.

What is claimed is:

1. An electric snowmobile, comprising:
a body frame extending in a front-rear direction;
a driver's seat supported by the body frame;
an electric motor supported by the body frame;
a ski supported by the body frame;
a track mechanism, which includes a track belt, and which is supported by the body frame below the driver's seat;
a battery that supplies electric power to the electric motor; and
a control unit including an electronic component and a housing for housing the electronic component, the electronic component controlling a rotation of the electric motor or driving of the battery, wherein
an opening is formed in the body frame so that a portion of the control unit is exposed from the opening to face the track belt;
wherein the opening is formed such that a portion of the track belt is disposed in an extension of the opening in a direction perpendicular to an opening surface of the opening.

2. The electric snowmobile according to claim 1, wherein a heat dissipating structure is provided in the housing, and the opening exposes the heat dissipating structure so as to face the track belt.

3. The electric snowmobile according to claim 2, wherein the heat dissipating structure includes a plurality of radiator fins protruding to an outside of the body frame.

4. The electric snowmobile according to claim 3, wherein the heat dissipating structure includes a base portion and the plurality of radiator fins protruding from the base portion, and
the electronic component is provided on a surface of the base portion opposite to a surface on which the plurality of radiator fins are provided.

5. The electric snowmobile according to claim 4, wherein the base portion is fastened to a peripheral portion of the opening in the body frame using a fastener.

6. The electric snowmobile according to claim 4, wherein a sealing member is provided between the base portion and the peripheral portion of the opening in the body frame.

7. The electric snowmobile according to claim 4, wherein the control unit includes a connection terminal, and the connection terminal is provided on an opposite side of the plurality of radiator fins through the opening.

8. An electric snowmobile, comprising:
a body frame extending in a front-rear direction;
a driver's seat supported by the body frame;
an electric motor supported by the body frame;
a ski supported by the body frame;
a track mechanism, which includes a track belt, and which is supported by the body frame below the driver's seat;
a battery that supplies electric power to the electric motor; and
a control unit including an electronic component and a housing for housing the electronic component, the electronic component controlling a rotation of the electric motor or driving of the battery, wherein
an opening is formed in the body frame so that a portion of the control unit is exposed from the opening to face the track belt;
wherein
the body frame includes an upper plate, on which the driver's seat is directly or indirectly disposed, and a front side plate extending downwardly from a front portion of the upper plate,
the opening is formed in the front side plate, and
the control unit is provided along the front side plate.

9. The electric snowmobile according to claim 8, wherein the front side plate includes an inclined plate and a lower plate, the inclined plate extending and inclining forwardly and downwardly from the front portion of the upper plate, the lower plate extending downwardly from the inclined plate, the opening is formed in the inclined plate, and the control unit is provided along the inclined plate.

10. An electric snowmobile, comprising:

a body frame extending in a front-rear direction;

a driver's seat supported by the body frame;

an electric motor supported by the body frame;

a ski supported by the body frame;

a track mechanism, which includes a track belt, and which is supported by the body frame below the driver's seat;

a battery that supplies electric power to the electric motor; and a control unit including an electronic component and a housing for housing the electronic component, the electronic component controlling a rotation of the electric motor or driving of the battery, wherein an opening is formed in the body frame so that a portion of the control unit is exposed from the opening to face the track belt;

wherein the body frame includes an upper plate on which the driver's seat is directly or indirectly disposed, the opening is formed in the upper plate, and the control unit is provided on the upper plate.

11. The electric snowmobile according to claim 1, wherein the control unit is disposed between the electric motor and the track belt in a front-rear direction.

12. An electric snowmobile, comprising:

a body frame extending in a front-rear direction;

a driver's seat supported by the body frame;

an electric motor supported by the body frame;

a ski supported by the body frame;

a track mechanism, which includes a track belt, and which is supported by the body frame below the driver's seat;

a battery that supplies electric power to the electric motor; and a control unit including an electronic component and a housing for housing the electronic component, the electronic component controlling a rotation of the electric motor or driving of the battery, wherein an opening is formed in the body frame so that a portion of the control unit is exposed from the opening to face the track belt;

wherein the control unit is disposed between the electric motor and the battery in a front-rear direction.

13. An electric snowmobile, comprising:

a body frame extending in a front-rear direction;

a driver's seat supported by the body frame;

an electric motor supported by the body frame;

a ski supported by the body frame;

a track mechanism, which includes a track belt, and which is supported by the body frame below the driver's seat;

a battery that supplies electric power to the electric motor; and a control unit including an electronic component and a housing for housing the electronic component, the electronic component controlling a rotation of the electric motor or driving of the battery, wherein an opening is formed in the body frame so that a portion of the control unit is exposed from the opening to face the track belt;

wherein a heat dissipating structure is provided in the housing, and the opening exposes the heat dissipating structure so as to face the track belt;

wherein the heat dissipating structure includes a plurality of radiator fins protruding to an outside of the body frame;

wherein the heat dissipating structure includes a base portion and the plurality of radiator fins protruding from the base portion, and the electronic component is provided on a surface of the base portion opposite to a surface on which the plurality of radiator fins are provided.

* * * * *